United States Patent [19]
Davis

[11] 3,773,082
[45] Nov. 20, 1973

[54] FLUID VALVE
[75] Inventor: William P. Davis, Salt Lake City, Utah
[73] Assignee: Bio-Logics Products, Inc., Salt Lake City, Utah
[22] Filed: Jan. 5, 1971
[21] Appl. No.: 104,103

Related U.S. Application Data
[63] Continuation-in-part of Ser. No. 794,099, Jan. 27, 1969, abandoned.

[52] U.S. Cl................. 137/625.48, 251/31, 251/61, 251/367, 251/176
[51] Int. Cl.......................................... F16k 31/145
[58] Field of Search.................. 137/625.48; 251/61, 251/31, 367, 176

[56] References Cited
UNITED STATES PATENTS
| | | | |
|---|---|---|---|
| 3,521,674 | 7/1970 | Dodson et al................. | 137/625.48 |
| 3,349,800 | 10/1967 | Herion et al.............. | 137/625.48 X |
| 2,923,311 | 2/1960 | Jeffrey............................ | 251/367 X |
| 2,252,141 | 8/1941 | Seidel et al. ................... | 137/625.48 |
| 2,828,767 | 4/1958 | Barusch..................... | 137/625.48 X |

Primary Examiner—Arnold Rosenthal
Attorney—B. Deon Criddle

[57] ABSTRACT

A fluid valve comprising a valve body, a stationary valve plate mounted to the valve body and having a flat sealing surface juxtaposed a recess in the body, the valve plate defining two outlet ports, a spring biased relatively movable valve slider member slidably engaging the valve plate within the valve body recess in surface-to-surface relation and having a fluid influent port therein to which fluid is continuously supplied and from which fluid is selectively communicable with either of the outlet ports, a sealed relation being maintained between the slider member and the valve plate as the slider member moves across the sealing surface between the outlet ports so that no fluid is isolated within the valve during fluid flow therethrough and the valve does not displace fluid into or out of the valve after the influent port clears one outlet port and before it achieves fluid communication with the other outlet port. Opposed diaphragm assemblies are mounted at opposite sides of the valve and respectively subjected to control fluid pressure at different points in time to shift the slider member from one operative position to the other as a result of displacement of an umbrella plate carried by each diaphragm and a pin interposed between one umbrella plate and one side of the slider member.

5 Claims, 3 Drawing Figures

Patented Nov. 20, 1973
3,773,082
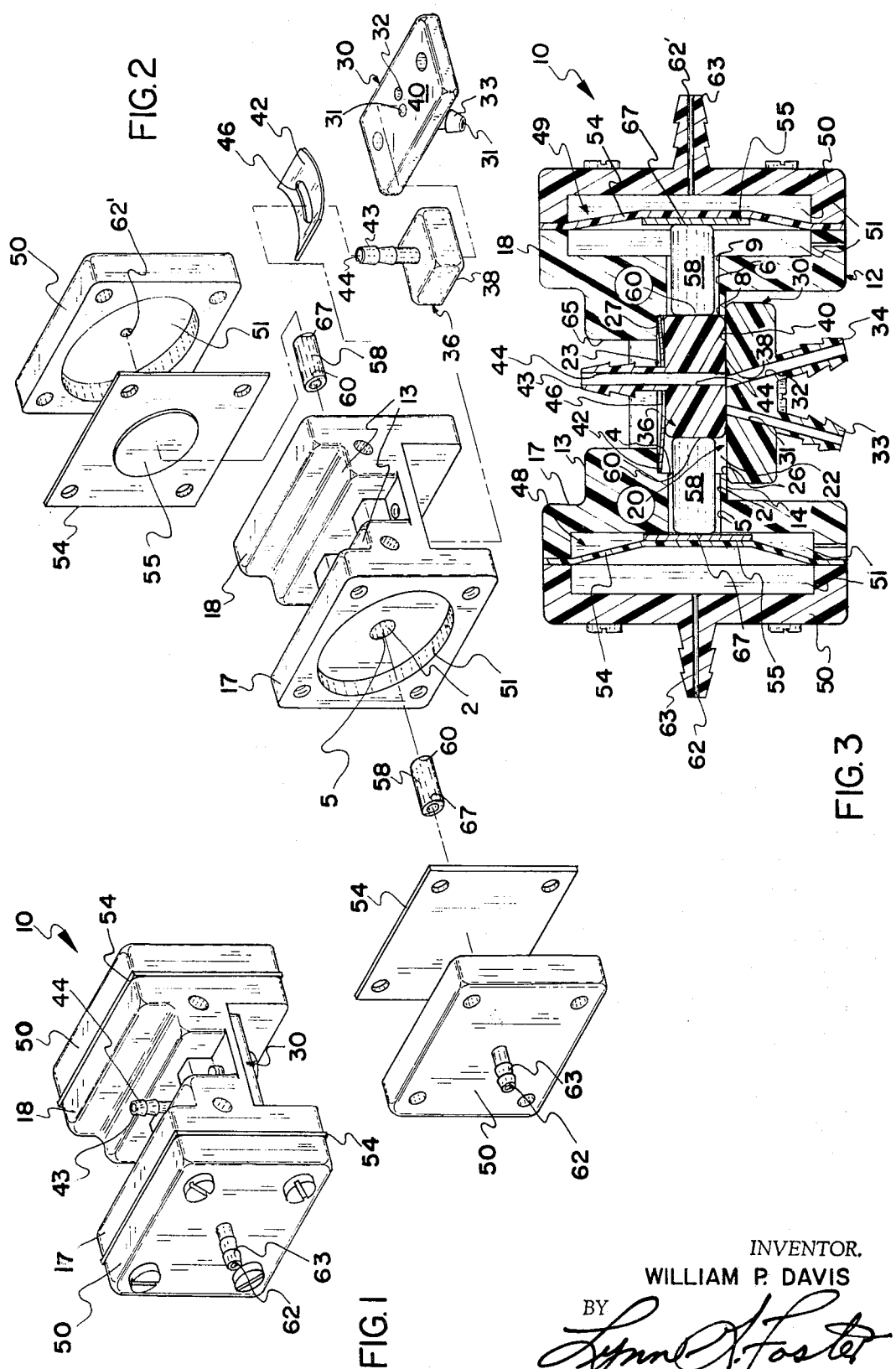
INVENTOR.
WILLIAM P. DAVIS
BY
Lynn A. Foster
ATTORNEY 3,773,082

FLUID VALVE

BACKGROUND

1. Field of the Invention

The present application is a continuation-in-part of U.S. Pat. application Ser. No. 794,099, filed Jan. 27, 1969, and now abandoned.

The present invention relates generally to valve structure and more specifically to a novel fluid valve which is economical, highly reliable, does not trap and contaminate fluid, and accurately controls the quantity of fluid displaced therethrough.

2. Prior Art

There are many valve constructions presently known in the art which include a movable valve member for selectively connecting a supply passage with one or more outlet ports. These prior valve constructions have the primary disadvantages of either trapping fluid within the valve itself resulting in contamination and also detracting from the accuracy of the volume delivered by the valve, or displacing fluid into or out of the valve as the valve shifts from one outlet port to the other.

In one prior valving arrangement, a supply tube is pivotally mounted for movement between positions where the outlet end of the supply tube is adjacent either one or the other of two outlet tubes. The disadvantage in this construction is that as the supply tube is pivoted from one outlet tube to the other, fluid in the supply tube can escape between and around the tubes thus making the valve construction unsuitable for applications which require the accurate measurement and control over the volume of fluid supplied through one or both of the outlet tubes.

In another and better known valve construction, commonly referred to as a spool valve, a shiftable valve member is slidably mounted in a cylindrical bore and has lands thereon which selectively provide communication between the supply port on one side of the valve bore and outlet ports on the other side of the valve bore. The disadvantage in this valve construction for many applications is that fluid is trapped between the lands on the valve member which makes the valve extremely difficult to clean and causes contamination when the valve is used in certain environments such as with biomedical devices employing fluids easily contaminated. Moreover, the fluid or liquid trapped between the lands reduces the accuracy and capability of the valve to deliver a discrete and measured volume of fluid.

Other valving arrangements known in the prior art have one or more of these disadvantages.

BRIEF SUMMARY AND OBJECTS OF THE PRESENT INVENTION

Valves according to the present invention are preferably inert to corrosive fluid and comprise a valve body or housing which carries a stationary member and a slider member together defining complementary passageways with alignable openings across a sealed surface-to-surface interface for direct, non-torturous fluid flow through the valve along either one of two possible paths. Such valves further comprise structure for reciprocably displacing the slider member between one operative position creating one of the two flow paths through the valve and the other operative position creating the second flow path through the valve, the displacing structure including a chamber-confined diaphragm which is selectively deflected by control fluid pressure causing a rigid member attached to one side of the diaphragm to displace a rod which in turn displaces the slider member in the manner mentioned. Accordingly, negligible friction loss and pressure drop occur across the valve and contamination or static entrapment of fluid cannot occur.

With the foregoing in mind, it is a primary object of the present invention to provide a novel valve through which an accurate quantity of fluid may be displaced along either one of two paths.

A further significant object of the present invention is the provision of novel valve structure wherein either one of two essentially linear passageways is aligned with a third generally linear passageway to define an essentially continuous flow path of uniform shape and size wherein friction loss and pressure drop are negligible, valve corrosion does not result, contamination and static entrapment of fluid is avoided and the fluid dispensed from the valve is of precise quantity.

It is a further important object of the present invention to provide a valve assembly which is economical to manufacture and maintain and which is highly reliable for use in any one of several fields, including the health care field.

These and other objects and features of the present invention will become more fully apparent from the following description and appended claims taken in conjunction with the accompanying drawings.

BRIEF DESCRIPTION OF THE DRAWINGS

FIG. 1 is a perspective representation of a presently preferred assembled valve according to the present invention;

FIG. 2 is an exploded perspective of the valve of FIG. 1; and

FIG. 3 is a longitudinal cross-section of the valve of FIG. 1.

DETAILED DESCRIPTION OF THE ILLUSTRATED EMBODIMENT

Referring to FIGS. 1–3 of the drawings, a fluid valve 10 is seen to include an elongated generally rectangular one-piece valve body 12, preferably of molded plastic, having a top surface 13, a bottom surface 14 and enlarged cup-shaped end portions 17 and 18. Opening at the bottom surface 14 is a rectangular recess 20. The recess 20 has flat side surfaces 22 and a flat upper surface 23 as well as flat end surfaces 26 and 27 that serve as stops, in a manner hereinafter more fully described. A bore 2 opens at opening 4 of the end surface 26 and at opening 5 of the cup-shaped end portion 17, while a bore 6 opens at opening 8 of end surface 27 and at opening 9 of the cup-shaped end portion 18, for purposes later to be more fully described.

Covering the recess 20 and fixedly mounted to the surface 14 of the housing 12 by suitable means, such as cap screws, is a valve plate 30 which has disposed centrally therein, with respect to the recess 20, two outlet ports 31 and 32 respectively for communicating fluid to either of two outlet conduits 33 and 34, to which hoses (not shown) or the like are coupled. The valve plate 30 is desirably made as one piece from plastic material which is inert to corrosive fluids.

A rectangular fluid-controlling one-piece valve slider block 36 is slidably mounted in the recess 20 for sideto-side reciprocation and has flat side surfaces justaposed and slidable in respect to the flat side surfaces 22 of the recess 20, so that the latter serves as guides to confine the valve block 36 to accurate rectilinear side-to-side sliding movement within the recess 20. Disposed centrally within the slidable valve block 36 is a fluid influent port 44 having, as illustrated in the Figures, a lower opening coplanar with the valving surface 38 and an upper opening communicating with a valve supply conduit 43, which projects upwardly outside the valve housing 12 to which an influent hose (not shown) or the like is coupled. Valve block 36 may be constructed of "Teflon" which is inert to corrosive fluids and has a flat valving surface 38 slidably engaging valving surface 40 of the valve plate 30. For urging the valving surfaces 38 and 40 into sealing though slidable engagement, a configurated leaf spring 42 is seated within the recess 20 remote to the valve plate 30. The spring 42 centrally engages the upper surface of the valve block 36 and engages at its ends the recess surface 23 thereby urging the surface 38 of the block 36 into positive sealing, though slidable engagement with the surface 40 of the valve plate 30. An elongated slot 46 in the spring 42 accommodates reciprocation of the conduit 43 with the block 36.

The influent port 44 is positioned so that it communicates fully with one outlet port 31 and 32 or the other depending on the position of the valve block 36. The surfaces 26 and 27 of the recess 20 are engaged by the valve block 36 from time to time and serve as stops therefor to accurately align the influent port 44 with the outlet port 31 and the outlet port 32, respectively. A suitable recess 65 is provided in the valve body 12 to permit the mentioned reciprocation of the influent conduit 43.

For the purpose of shifting the valve block or slider 36 within the recess 20 from one extreme position to the other, opposed diaphragm assemblies 48 and 49 are provided, each including a cup-shaped end cap fixed to one of the end portions 17 and 18 of the housing 12, as by cap screws or the like, and defining therewith fluid-tight chambers 51. Dividing each chamber 51 in a direction essentially transverse to the path of reciprocation followed by the valve slider 36 is a flexible diaphragm 54 having a rigid umbrella plate 55 centrally fixed thereto, as by bonding. The edge of each diaphragm is securely and tightly held between the opposed edges of the associated end cap 50 and the associated end portion 17 or 18. A pin 58 is slidably disposed in the complementary axial bores 2 and 6 in the housing 12 and each is sized and shaped so that ends 60 engage opposite ends of the valve block 36 for displacement of the block 36 between its two operative positions. In like manner, ends 67 of the two pins 58 contact or merge with the associated umbrella plate 55 for joint displacement.

Control ports 62 and 62' are respectively formed in the end caps 50, the housing 63 of each control port being adapted to receive fluid pressure from a suitable source of supply (not shown) through a hose (not shown) or the like. Only one control port is subjected to fluid pressure at any one point in time. When the left control port 62 receives a fluid pressure signal, the diaphragm 54 associated therewith will, under force of pressure, be displaced toward the right to thereby shift the left pin 58, the valve slider 36, the right pin 58, the right diaphragm 54 to the right until the valve slider engages in the surface 27 where accurate alignment will result between the influent port 44 and the outlet port 32.

Similarly, when the right control port 62' is pressurized, the two diaphragms 54, the two pins 58 and the valve slider 36 will shift from their right positions to their left positions, shown best in FIG. 3, causing the valve slider to engage the end surface 26 and the influent port 44 to become accurately aligned with the outlet port 31.

It may be readily seen that since the influent port 44 continuously communicates with a source of fluid under pressure, no leakage, entrapment or contamination of fluid can or does occur within the valve and the amount of fluid metered through the valve during any period of time may be accurately determined. Another important feature results in that as the influent port 44 clears one outlet port, no fluid may be displaced from the inlet port 44 until communication is established with the other outlet port.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by the United States Letters Patent is:

1. A fluid-controlled fluid valve comprisng:
body means defining a space and comprising two stop means;
fluid influent and effluent structure carried by the body means, the fluid influent and effluent structure comprising a stationary member secured to the body means and a slider member held within the space of the body means in contiguous surface-to-surface sealed and slidable relation with the stationary member by biasing means, the slider member being slidable between two operative positions defined by the stop means, one of said members comprising an essentially linear passageway through which fluid is displaced when the valve is receiving fluid and which directly opens at the sealed surface of the one member, the other of said members comprising two juxtaposed essentially linear passageways either of which transmits fluid when the valve is receiving fluid and is in one of the two operative positions, each passageway of the other member directly opening at the sealed surface of the other member, the opening of each passageway of the other member being sized, shaped and located so that one passageway opening of the other member is aligned with the passageway opening of the one member and the second passageway opening of the other member is closed by the sealed surface of the one member when the valve is in one operative position, and the second passageway opening of the other member is aligned with the passageway opening of the one member and the one passageway opening of the other member is closed by the sealed surface of the one member when the valve is in the other operative position, a fluid influent member communicating with the linear passageway in said one member and reciprocable with said slider member, said biasing means comprising a configurated leaf spring interposed between the body means and the surface of said slider member opposite from said sealed surface engaging said surface of said slider member over the entire path of movement and formed with an elongated slot therethrough to receive and accommodate reciprocation of said fluid influent member;

structure carried by the body means for shifting the slider member reciprocally in a path generally transversed to the axes of the passageway openings between engagement with the respective stop means from one operative position to the other, the shifting structure comprising fluid-tight chamber means, means for communicating fluid control pressure to the chamber means, flexible diaphragm means within the chamber means and against which the fluid control pressure is exerted to displace the diaphragm means, rigid means carried at one surface of the diaphragm means opposite where the fluid pressure is exerted, rod means reciprocally disposed in the body means and interposed between the rigid means and the slider member to impart the fluid control displacement of the diaphragm means to the slider member thereby sliding the slider member between operative positions.

2. A valve as defined in claim 1 wherein the body means is of one-piece plastic construction, the space is a recess and the stop means are opposed walls of the recess.

3. A valve as defined in claim 1 wherein the stationary means and the slider means are each of one-piece plastic construction and comprise a hollow conduit constituting part of each passageway.

4. A valve as defined in claim 1 wherein the shifting structure comprises opposed chambers each containing a flexible diaphragm to which a plate is centrally attached and against which a pin is associated for direct displacement of the slider member between the two operative positions.

5. A valve as defined in claim 1 wherein the slider member and the stationary member are respectively fabricated in one piece of plastic material inert to corrosive fluid and wherein any two passageways when aligned one with the other comprise a generally linear flow path of essentially uniform shape and size which causes all fluid in the valve to be immediately purged from the valve upon subsequent fluid flow to the valve whereby friction loss and pressure drop through the valve are negligible, corrosion does not result, contamination and static entrapment of fluid is avoided and the fluid dispensed from the valve is of precise quantity.

* * * * *